United States Patent [19]
McVay

[11] 3,902,596
[45] Sept. 2, 1975

[54] ADDITIVE PACKAGE FOR COMPOUNDING RESINS

[75] Inventor: Malcolm Scott C. McVay, Aurora, Ohio

[73] Assignee: U.S. Chemicals and Plastics, Inc., Division of Alco Standard Corporation, Canton, Ohio

[22] Filed: Jan. 2, 1974

[21] Appl. No.: 430,063

Related U.S. Application Data

[63] Continuation-in-part of Ser. Nos. 10,316, Feb. 10, 1970, abandoned, and Ser. No. 210,018, Dec. 20, 1971, Pat. No. 3,784,005.

[52] U.S. Cl.................. 206/84; 206/219; 260/40 R; 260/862
[51] Int. Cl.²......................................... B65D 81/32
[58] Field of Search................... 206/84, 447, 219; 260/40 R, 862

[56] References Cited
UNITED STATES PATENTS
2,757,160  7/1956  Anderson.......................... 260/40 R
2,791,327  5/1957  Sparks et al. ........................ 206/84
2,806,595  9/1957  Spake ................................. 206/84
3,186,869  6/1965  Friedman............................ 206/84

FOREIGN PATENTS OR APPLICATIONS
955,079  4/1964  United Kingdom................ 206/219

Primary Examiner—William T. Dixson, Jr.

[57] ABSTRACT

A package to contain materials, including explosively decomposable polymerization initiator catalysts, such as organic peroxide catalysts, to be added to a resin formulation which contains vinylic monomer, comprises a thin wall polystyrene plastic envelope which is soluble in the resin formulation. The envelope is formed within a rigid container, the envelope and container comprising the package. Additive materials contained within the package envelope include an inert liquid vehicle such as mineral oil, which stabilizes the explosively decomposable catalyst and is nonreactive with the polystyrene envelope.

16 Claims, 8 Drawing Figures

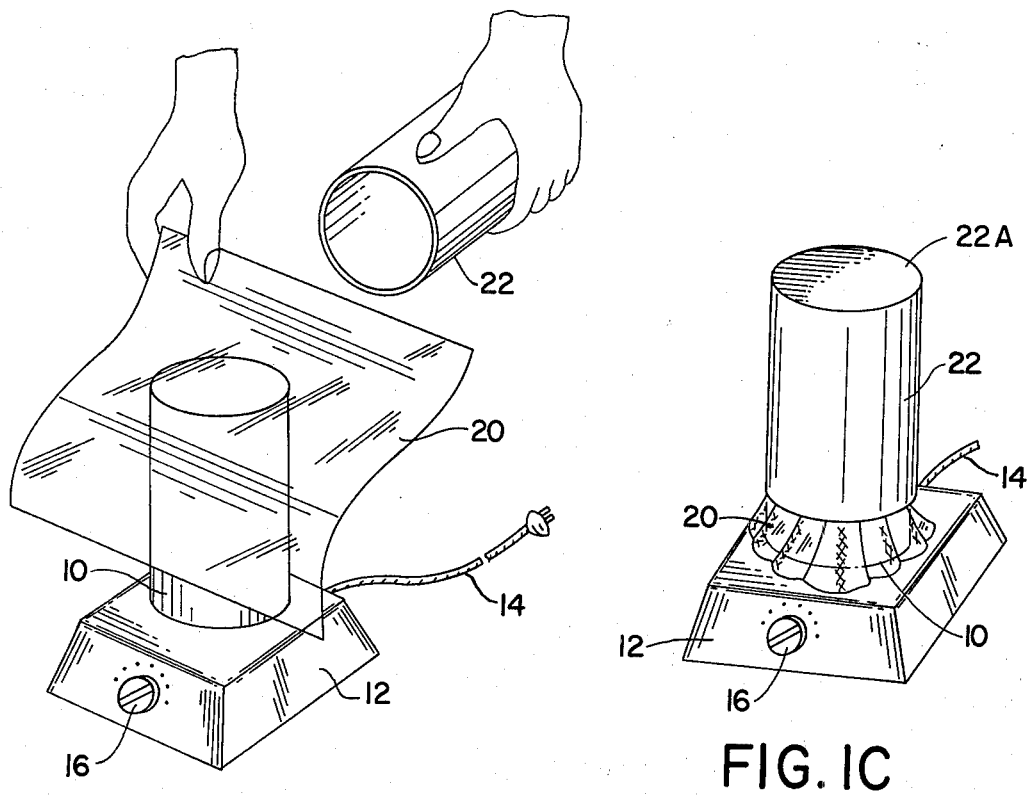
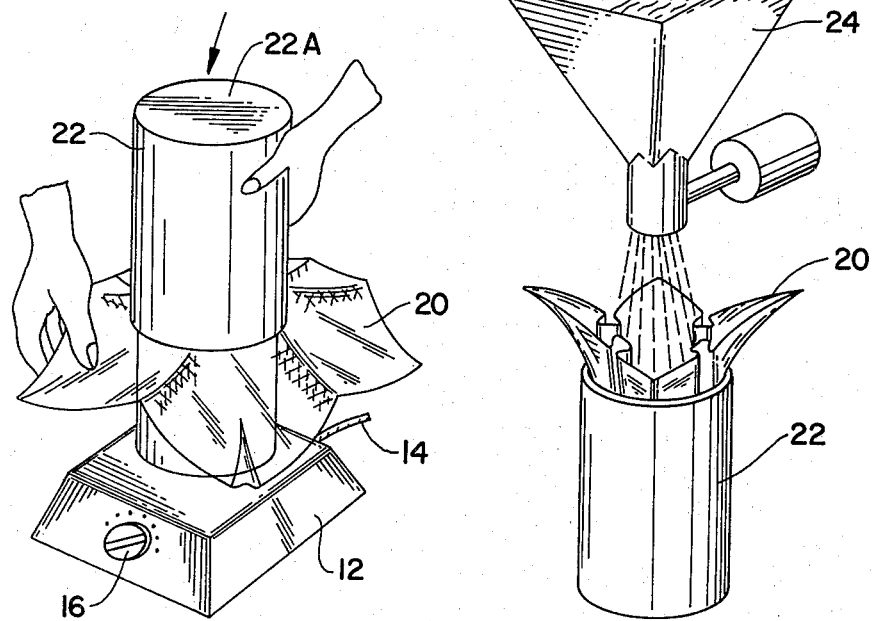
FIG. IA FIG. IC FIG. IB FIG. ID

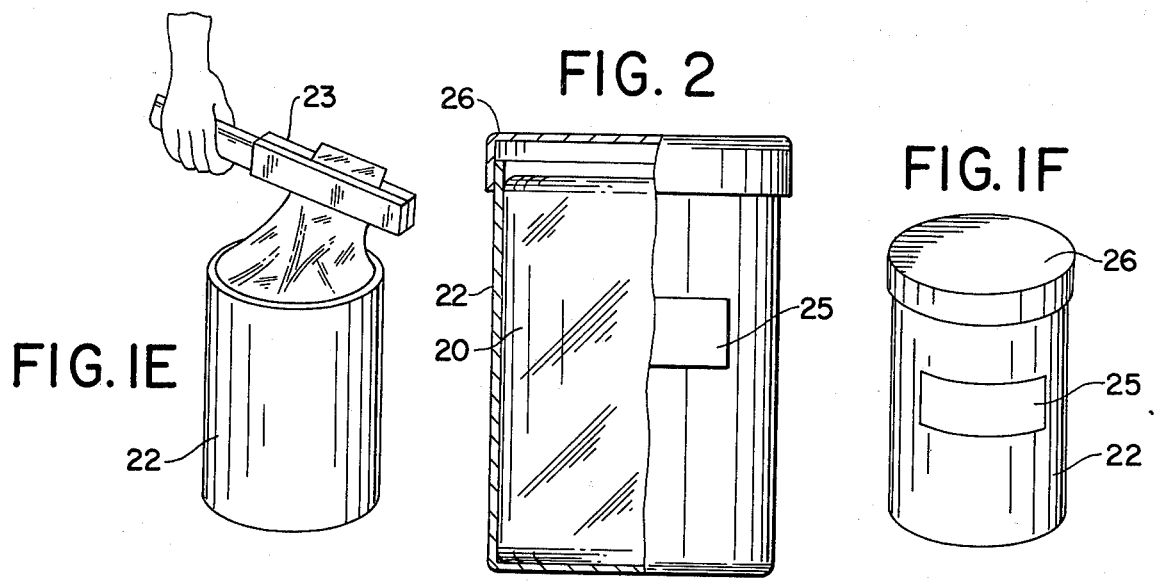
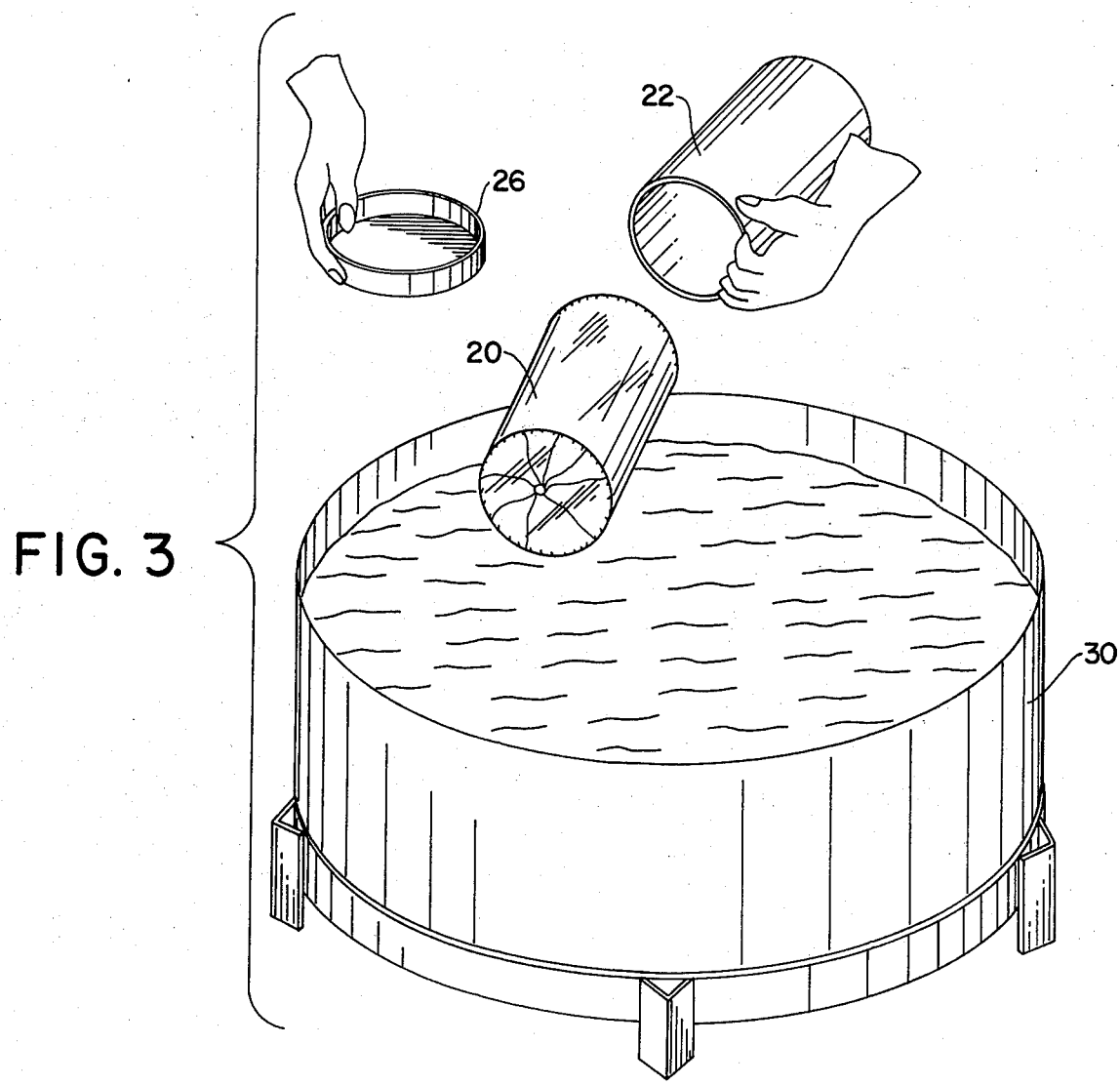

ADDITIVE PACKAGE FOR COMPOUNDING RESINS

This application is a continuation-in-part application to my copending applications Ser. No. 10,316, filed Feb. 10, 1970, now abandoned, and Ser. No. 210,018, filed Dec. 20, 1971, now U.S. Pat. No. 3,784,005.

This invention relates to the resin formulation compounding art and more particularly to an additive package for holding additives, including an explosively decomposable polymerization initiator catalyst in a stabilizing vehicle, which package is soluble in the resin formulation in which the additives are to be dissolved.

The invention is particularly applicable to compounding polyester resin formulations to which an explosively decomposable polymerization initiator catalyst is to be added. More particularly, the invention applies to compounding unsaturated polyester resins, where styrene or some other vinylic monomer is present for cross linking purposes. However, it will be appreciated that the invention is equally applicable to the compounding of any resin formulations to which must be added an explosively decomposeable polymerization initiator catalyst and which contains a component in which the material from which the package envelope (as described hereinbelow) is made, is soluble.

The term "additive" as used in this specification and claims, is intended to embrace any material which is added to a resin formulation, e.g., materials which are added to the resin formulation to modify its physical and/or chemical properties, or to facilitate the molding or curing of the resin. Without limiting the generality of the term, exemplary additives include catalysts, colorants, ultraviolet stabilizers, fillers, reinforcements, thixotropic agents, mold release agents, fire retardants, waxes to prevent air inhabitation, and silanes to improve adhesion of the resin to glass.

The terms "vinylic" or "vinyl" as used in this specification and claims have their usual, accepted meaning, i.e., to designate a molecule characterized by containing the general structure $CH_2=C <$. The term "vinyl(ic) monomer" means a monomer or other polymer precursor which has the characteristic vinylic structure.

The term "copolymer" as used in this specification and claims has its usual meaning as being a polymeric material which combines two or more different monomers in the polymeric molecular structure.

The compounding of resin formulations by maintaining on hand bulk quantities of the additives to be introduced into the resin batch, measuring out the desired quantities of additives from bulk reservoirs, and then adding the measured amount of additive to the polyester resin formulation batch, is a procedure which suffers from a number of disadvantages. It requires the resin compounder to maintain on his premises bulk quantities of a variety of additives. The potential for error in measurement exists everytime a portion must be taken from the bulk additive and introduced into the formulation. Additives with short shelf lives may deteriorate before they can be used. The spillage of additives which may occur during measurement and transfer of the additive to the resin is not only wasteful and costly, but may result in inaccurate quantities of additives being introduced and consequent failure to meet specifications.

Further, where an additive consists of a suspension of particles in a liquid vehicle, as is the case with sensitive catalysts, such as benzoyl peroxide, used in compounding polyester resin formulations, the particles tend to settle out on standing. Consequently, when a measured amount of suspension is removed from a bulk container, the actual concentration of the particles will vary depending on the amount of settling which has taken place, and whether the measured amount is taken from the top or the bottom of the bulk container. In any event, this procedure makes it exceedingly difficult to maintain a close control over the amount of particles, e.g., benzoyl peroxide catalyst, which is added to a given batch of polyester resin.

One approach for solving the foregoing problems is to pre-package the additive in a sealed additive package which is soluble in the resin formulation; such package may be referred to as a soluble additive package.

The aforementioned U.S. Pat. No. 3,784,005 discloses a novel and improved soluble additive package which overcomes many of the prior art difficulties with such packages by providing a package envelope consisting of a thin film of polystyrene or other polymer film soluble in the resin formulation.

The package envelope, being made of extremely thin film, preferably not more than about 5 mils in thickness, most preferably not more than about 2 mils in thickness, is readily soluble in the resin formulation. Because of its thinness the envelope is formed within and supported by a rigid outer container. In use, the package envelope is deposited directly from the rigid supporting container into the resin formulation batch. While this type of package provides an envelope of sufficiently thin material to assure rapid and complete solution thereof in the resin formulation, and a small enough bulk of the film material so that undesirable properties are not imparted to the resin by the dissolution of the envelope material therein, the utilization therein of certain types of catalysts, which require liquid stabilizing vehicles as more fully described hereinbelow, presents a serious problem because the conventional liquid stabilizing vehicles within which it is necessary to suspend the catalysts rapidly attack and destroy the thin film of the package envelope.

Explosively decomposable polymerization initiator catalysts, such as organic peroxide catalysts, upon being subject to shock, heat, friction or contamination with a substance with which rapid reaction occurs, react to form gaseous reaction products at an explosive rate. Benzoyl peroxide is typical of such catalysts. Organic azo catalysts such as, for example, 2,2-azo(bis-)isobutylnitrile, are also explosively decomposable polymerization initiator catalysts. Such catalysts are sufficiently sensitive to shock, heat, friction, etc. that they require special handling in shipment and storage to prevent explosions. For brevity, such explosively decomposable polymerization initiator catalysts are sometimes hereinafter referred to as "sensitive catalysts".

Generally, refrigeration and the use of special containers in storage and transport, as well as precautionary labeling of such compounds is required by law. The degree of refrigeration required depends upon the decomposition temperature of the particular compound involved. Sensitivity to shock may be such that the shock sustained in mixing, pumping or grinding the material during the formulation process may be sufficient to ignite or explosively decompose the compound. Metal salts, acids and amines are highly reactive with such compounds, causing the release of quantities of oxygen or nitrogen in an explosive manner.

Accordingly, when such sensitive catalysts are packaged for use in resin formulating, it is a customary precaution to suspend the catalyst particles in a liquid vehicle which stabilizes the sensitive catalyst and substantially reduces explosion hazard. Generally, for organic peroxide catalysts and organic azo catalysts, a mixture of not more than 20 percent by weight of catalyst suspended in an inert stabilizing vehicle substantially reduces the explosion hazard posed by the catalyst so that it may be handled and stored without the need for special precautions, and added to the resin formulation without danger of explosion.

For example, it is a known prior art expedient (see British Pat. No. 955,079, to Manly) to suspend peroxide catalyst particles in a vehicle such as tricresyl phosphate, butyl phthalate or dioctyl phthalate. While such materials serve well as vehicles for sensitive catalysts and effectively eliminate the dangers of explosion, such materials attack polystyrene and other polymer films used to form the additive package, to the extent of precluding the use of thin film additive packages for sensitive catalysts and their stabilizing vehicles, if any reasonable shelf lofe, e.g., more than 2 days, is required.

It is accordingly an object of the present invention to provide an additive package containing a sensitive catalyst suspended in an inert stabilizing vehicle, which package has good shelf life, wherein the vehicle is substantially inert to the package envelope material.

It is accordingly an object of this invention to provide an additive package containing a sensitive catalyst in a stabilizing vehicle, which pacakge overcomes the foregoing problems and provides an air-tight, soluble package of unlimited shelf life, which is simple and easy to manufacture and which will completely dissolve in a short time even in resin formulations containing only a small proportion of components in which the plastic film is soluble.

In accordance with the present invention, there is provided an additive package for sensitive catalysts which comprises an envelope made of a film of synthetic organic polymeric material which is soluble in at least one component of the resin formulation into which the package is to be introduced, the catalyst being suspended in a liquid vehicle which is inert to the film of synthetic organic material and which stabilizes the catalyst.

In accordance with another aspect of this invention, there is provided an additive package for oxygen or nitrogen releasing polymerization catalysts comprising an envelope made of a thin film of synthetic organic polymeric material which is soluble in at least one component of the resin formulation into which the additive is to be introduced, the thin film envelope being formed in and supported by a rigid shipping and storage container, and the catalyst being suspended in an inert liquid vehicle which stabilizes the catalyst.

In accordance with another aspect of the invention the inter liquid stabilizing vehicle is selected from the class consisting of mineral oil, castor oil, menhaden oil, coconut oil, cottenseed oil, soybean oil, linseed oil, peanut oil, and completely saturated polyester resins formed by the condensation reaction of a dibasic acid and a dihydroxy alcohol.

In accordance with the invention it has been found that sensitive, polymerization initiator catalysts are rendered non-hazardous for ordinary storage and use, i.e., are stabilized, when the catalyst is suspended in an inert vehicle in accordance with the invention in proportions such that the catalyst comprises not more than 20 percent by weight of the combined weight of catalysts and inert vehicle.

This suspension of catalyst in the inert vehicle may be included together with any other additives required for addition to the resin formulation without danger of explosion caused by rapid decomposition of the catalyst due to heat, friction, shock, etc.

In general, it has been found that the upper limit of the amount of mineral oil or other inert vehicle to be added to the formulation is set by the fact that an excessive amount of oil will tend to cause smoking in the plastic molding apparatus. However, utilization of a ratio in the vicinity of 20 percent by weight catalysts and the remainder being the vehicle oil or resin as disclosed herein, provides a useful formulation which does not result in smoking or other adverse effects in the molding process.

The following is a tabulation of specific liquid vehicles utilizable in accordance with the invention to stabilize the catalysts while being inert to the film package material. Light mineral oil is the preferred vehicle, but the others are useable in accordance with the invention; primary physical and chemical characteristics of the preferred, commercially available grades for the various vehicles are shown.

TABLE I

| | Specific Gravity (Sp. Gravity) at 25° C. |
|---|---|
| MINERAL OIL (LIGHT) | Sp. Gravity .818–.880<br>Viscosity-Not more than 37 Centistokes at 37.8° C |
| MINERAL OIL (HEAVY) | Sp. Gravity .880–950<br>Viscosity at least 38.1 Centistokes at 37.8° C |
| CASTOR OIL | Sp. Gravity .945–.965<br>Sponification Value 178<br>Iodine Value 85 |
| MENHADEN OIL | Sp. Gravity .927–.933<br>Sponification Value 191–196<br>Iodine Value 139–180<br>Refractive Index 1.48 |
| COCONUT OIL | Sp. Gravity .92<br>Saponification Value 250 – 258<br>Iodine Value 8 – 9.5<br>Melt Pt 20 – 28° C |
| COTTONSEED OIL | Sp. Gravity .915 – .921<br>Saponification Value 190 – 198<br>Iodine Value 109 – 116 |
| SOYBEAN OIL | Sp. Gravity .924 – .929<br>Saponification Value 190 – 193<br>Iodine Value 137 – 143<br>Refractive Index 1.476 – 1.4775 |
| PEANUT OIL | Sp. Gravity .912 – .920<br>Saponification Value 186 – 194<br>Iodine Value 88 – 98<br>Refractive Index 1.4625 – 1.4645 |
| LINSEED OIL | Sp. Gravity .931 – .936<br>Saponification Value 189 – 195<br>Iodine Value 177 |
| POLYESTER RESIN (UNCURED) | Fully Saturated, condensation reaction product of a dibasic acid and a dihydroxy alcohol. |

It will be understood that specifications of the commercially available products given above vary, and any of the above liquids in other grades are suitable for use in accordance with the invention. As used in the claims, "mineral oil" includes both light and heavy mineral oil as listed above.

The most preferred stabilizing vehicle is a light, white mineral oil, of the following typical specifications, such as that sold under the tradename "Penn-Drake, Drakeol 9 NF," by Pennsylvania Refining Company of Butler, Pennsylvania. Light Mineral Oil (Drakeol 9 NF)

Specific Gravity (25° C) 0.829 – 0.854
Viscosity (27.8° C) 17.7 Kinematic, Centistokes
Refractive Index - 1.4667
Pour point, ASTM - 15° F
Flash point, ASTM - 365° F The preferred saturated polyester resin is the condensation product of phthalic anhydride and diethylene glycol.

The formulation package of the invention is useable with any resin formulation which contains one or more components in which the film of organic polymeric material will dissolve, i.e., one or more "solvent components". The term "solvent component" is used in some of the claims to mean the component of the formulation which will dissolve the film. For example, film materials such as polystyrene will dissolve in aromatic compounds (unsaturated cyclic compounds), in napthenic oils and solvents (cycloparaffins) and in esters. Polystyrene and other polymers of vinyl monomers (to the extent they can be formed into self-supporting thin films) such as vinyl toluene, methyl methacrylate, alpha-methyl styrene, diallyl phthalate, triallyl cyanurate, and methyl acrylate, are soluble in resin formulations containing vinylic monomers.

The invention will be described in detail in connection with a preferred embodiment thereof, which is illustrated in the attached drawings wherein:

FIGS. 1A through 1F show schematically the sequence of assembling an additive package in accordance with the invention;

FIG. 2 shows a partial section view of a package in accordance with the invention; and FIG. 3 shows schematically the use of an additive package in accordance with the invention.

Referring now to FIG. 1-A, there is shown an electrically heated substantially cylindrically shaped mandrel 10 supported on its base 12 and provided with a lead 14 to a power source (not shown), and a control 16 to adjust the surface temperature of the mandrel 10.

A sheet of thin plastic film 20, preferably 1 mil thick polystyrene, is held in place substantially centered over the mandrel. A rigid container 22, the inner surface of which substantially conforms to the outer surface of mandrel 10, is slipped onto mandrel 10 and over film 20, as shown in FIG. 1B.

As shown in FIG. 1-C, container 22 is pushed all the way down onto mandrel 10 until the closed end 22-A of container 22 meets the upper horizontal surface of mandrel 10. Sheet 20 is seen to be large enough so that a folded portion thereof extends beyond the end of container 22 for a distance sufficient to provide a sealing flap for the finished envelope.

At this point, additives including a sensitive catalyst and an inert stabilizing vehicle in accordance with the invention, are placed inside the film envelope as shown in FIG. 1-D, wherein a feed hopper 24 introduces a measured quantity of additives into the envelope. After filling, the protruding flaps of film are sealed, as shown in FIG. 1E, by any suitable means, shown schematically as a heat sealer 23. Obviously, any suitable means, such as twisting or folding, heat sealing, employing an adhesive, or a tie cord, etc., may be used to seal the envelope.

Finally, a lid 26 is placed over container 22 (FIG. 1-F) to complete the shipping and storage and container. Shipping labels, identifying, and/or instruction labels, etc., shown as item 25 may of course be applied.

It will be observed that the thin film package is formed by its rigid shipping and storage container, and is at all times from the moment of being formed, protected and supported by the rigid container. Accordingly, the very thin sheet of plastic is able to withstand the filling operation and the handling in shipment and storage without rupturing. By using a rigid container made of or lined with a liquid-resistant material, even a small leak in the envelope presents no great problem. Normally, a simple cardboard construction of the rigid container will suffice, because rupture of the thin film material is prevented by the support of the rigid container 22. This is shown in FIG. 2, where even if a rupture should appear in the film, significant leakage through the film is precluded by the back-up provided by the inner surface of container 22. At any event, being fully supported at all points by the container, the likelihood of a rupture in the film is remote. If desired, cap 26 may be sealed to container 22 by any suitable means, for storage and shipment.

The film is not subject to attack by the catalyst stabilizing vehicle, of the invention, which is inert to polystyrene and other organic polymeric material films.

When the package is to be used, as shown in FIG. 3, lid 26 is removed from container 22, and container 22 is simply up-ended over mixing vat 30, which contains the resin formulation. Envelope 20 with its content of additivies, including the stabilized catalyst, slides out of container 22 and falls into the resin formulation. Envelope 20, being made of an extremely thin material, not more than 2 mils in thickness, readily dissolves in the resin formulation, even if the formulation contains only a minor amount of material which will serve as a solvent for the material of envelope 20. Container 22 and lid 26 may be discarded or reused as desired.

The invention also contemplates an additive package which contains a plurality of additives in addition to the stabilized catalyst. Where the additives are compatible and non-reactive with each other, they may be admixed directly with each other and placed in the envelope.

Where the additives to be combined in a single envelope interact with each other, as for example many colorants will react with peroxide catalysts, it is contemplated that they be physically separated, yet within the same envelope. This can be accomplished by utilizing one envelope within another. It will be appreciated that a plurality of separate envelopes may also be employed to hold different additives which would be troublesome to hold in a single envelope.

The material from which the additive package envelope is formed should be readily soluble in the solvent component present in the resin system. When the solvent component is one or more vinyl monomers, then, as aforesaid, to the extent that these monomers polymerize, e.g., methyl acrylate and methyl methacrylate, to form self-supporting films or sheets which can then be dissolved in the monomers, their polymerizates in thin sheet or film form may also serve as the material forming the additive package envelope.

Present economics strongly favor polystyrene film as the synthetic organic polymeric material for forming the additive package envelope. According to the preferred embodiment of the invention the polystyrene takes the form of an oriented film, having a thickness up to about 2 mils and preferably between about 1 and 1.5 mils.

Non-oriented film may also be used but to no particular advantage, and it is generally less readily available and more expensive than oriented film.

The substitution of a mineral oil as a vehicle to stabilize a peroxide catalyst in place of the usual phthalate vehicle, does not adversely affect the properties of the finished product, and the coating action of the mineral oil on the particles permits the additive to be prepackaged in a thin film, e.g., polystyrene, package in accordance with the invention. The suitability of the mineral oil vehicle is illustrated in the examples set forth below, as is the lack of adverse affect by introduction of the (dissolved) polystyrene film into the resin formulation.

EXAMPLE 1

The following ingredients were admixed in proportions indicated:

| INGREDIENT | Wt % |
| --- | --- |
| Unsaturated polyester resin* | 35.0 |
| Benzoyl peroxide paste (50% di octyl phthalate vehicle) | 0.6 |
| Black iron oxide | 1.0 |
| Zinc stearate | 1.2 |
| Asbestos floats | 27.2 |
| Calcium carbonate | 12.0 |
| ¼" glass fibers | 13.0 |
| ¼" sisal fibers | 10.0 |

*a commercially available premix resin, (1002-10 manufactured by Commercial Resin Division of Interplastic Corporation) based on maleic anhydride and dipropylene glycol, containing 25 wt percent vinyl toluene.

The glass fibers were added last to minimize breakage.

A portion of the resin composition was placed in a mold cavity and a slab measuring approximately 0.1 inch in thickness was molded and cured at conventional pressure and temperature values.

EXAMPLE II

The procedure described in Example 1 was repeated with the following changes:

USP mineral oil was substituted as the vehicle for the benzoyl peroxide and this ingredient together with the black iron oxide were placed in an envelope consisting of 5 mil thick oriented polystyrene film. The envelope together with its contents were admixed with the resin until the film dissolved in the vinyl toluene and the catalyst paste and pigment were substantially uniformly dispersed throughout the resin.

A visual inspection of the specimens produced in accordance with Examples I and II revealed no discernible differences.

The specimens were tested for flexural strength in accordance with ASTM D-790; for impact strength in accordance with ASTM D-790. The results are recorded in Table 1 below:

TABLE 1

| Physical Property | Example I | Example II |
| --- | --- | --- |
| Flexural strength, avg. (psi) | 10,806 | 11,734 |

TABLE 1-Continued

| Physical Property | Example I | Example II |
| --- | --- | --- |
| Impact strength (foot-lbs/inch of notch-Izod) | 2.87 | 3.13 |
| Flexural modulus (psi) | 668,080 | 701,280 |

The foregoing data indicates that the dissolution of the polystyrene bag in the resin and the use of mineral oil as the vehicle for the catalyst did not have an adverse affect on the physical properties of the molded specimen, even though a relatively thick (5 mils) thin film material was used.

EXAMPLE III

The following ingredients were admixed in the proportions indicated.

| INGREDIENT | Wt % |
| --- | --- |
| Unsaturated polyester resin* | 66 |
| Benzoyl peroxide paste (50% di-octyl phthalate vehicle) | 1.5 |
| Clay (ASP 400) | 30 |
| Green pigment dispersion | 2.5 |

*a commercially available resin based on isophthalic acid and diethylene glycol, believed to contain about 25 wt percent styrene.

A portion of the resin composition was placed in a mold cavity and molded and cured at conventional pressure and temperature values.

EXAMPLE IV

The procedure described in Example III was repeated with the following changes.

USP Mineral oil was substituted as the vehicle for the benzoyl peroxide and the resulting paste was placed in an envelope consisting of a 5 mil thick polystyrene film. The envelope together with its contents were admixed with the resin until the film dissolved in the styrene and the catalyst paste was uniformly dispersed throughout the resin.

A visual inspection of the specimens produced in accordance with Examples III and IV revealed no discernible differences.

The specimens were tested for hardness (Barcol) and no significant difference in values was found.

The present invention may be practiced advantageously with the incorporation of viscosity control agents or thickeners into resin systems. These agents find utility in resin formulations designed for sheet molding, bulk molding and low profile applications. Conventional viscosity control agents include CaO, Ca(OH)$_2$, MgO and Mg(OH)$_2$ As a foresaid, because of the hygroscopicity of these agents they are somewhat difficult to weigh accurately since the proportion of gross weight attributable to water pickup will vary with the length of time the material has been exposed to the atmosphere and the humidity in the atmosphere.

Further, since the pick-up of water tends to cause the materials to cake, it become difficult to uniformly distribute them throughout the resin. This problem is eliminated, in accordance with the present invention, by accurately weighing the viscosity control agents when dry and maintaining them in a dry state by sealing them in the additive package envelope which serves as a very satisfactory vapor barrier.

Although the dissolution of the envelope in the compounded resin does introduce a "contaminant", the quantity of polymeric material dissolved is so small particularly when a thin film is used that it has no discernible affect on the appearance or physical properties of the cured resin.

The invention is operative with any resin system containing a sufficient amount of solvent component to solubilize the additive package envelope within a reasonable period of time.

The polyesters, i.e., those resins formed by the reaction between a dibasic acid and a dihydroxy alcohols, which contain a vinyl monomer as a cross-linker, are particularly suitable.

The present invention contributes to the art an additive package useful in compounding polyester resins and a method of compounding such resins. The invention has been described in connection with certain specific embodiments. It will be appreciated however, that modifications of the disclosed invention will readily suggest themselves to those skilled in the art upon reading this disclosure. For example, multiple envelopes formed within their own rigid containers may be packed into a larger container to prepare a set of additive packages. Also, the envelope and rigid container (and necessarily, the mandrel) may have other than a cylindrical shape, e.g., the shape may be rectangular, ovoid or square in cross section. It is intended to include all such modifications within the scope of the appended claims.

What is claimed is:

1. A package for introducing additives, including a sensitive catalyst suspended in a stabilizing vehicle, to resin formulations containing at least one solvent component, comprising a rigid container having a surface clinging lining formed on the inside thereof, said lining comprising a removable envelope formed of a film of synthetic organic polymeric material not greater than about 2 mils thick, and soluble in said solvent component, said stabilizing vehicle being selected from the group consisting of, castor oil, menhaden oil, coconut oil, cottonseed oil, soybean oil, peanut oil, linseed oil, and fully saturated polyester resin.

2. The package of claim 1 wherein said organic polymeric material is polystyrene.

3. The package of claim 1 wherein said sensitive catalyst is an organic peroxide.

4. The package of claim 1 wherein said stabilizing vehicle is a fully saturated polyester resin which is the condensation reaction product of phthalic anhydride and diethylene glycol.

5. The package of claim 1 wherein said sensitive catalyst is an benzoyl peroxide.

6. A package for introducing additives including at least one sensitive catalyst to resin formulations containing at least one solvent component, comprising a rigid container having a surface clinging lining formed on the inside thereof, said lining comprising a removable envelope formed of a thin film of synthetic organic polymeric material and soluble in said solvent component, said envelope including a stabilizing vehicle within which said sensitive catalyst is dispersed, said vehicle being selected from the class consisting of, castor oil, menhaden oil, coconut oil, cottonseed oil, soybean oil, peanut oil, linseed oil, and fully saturated polyester resin.

7. The package of claim 6 wherein said organic polymeric material is polystyrene.

8. The package of claim 6 wherein said sensitive catalyst is an organic peroxide catalyst.

9. The package of claim 6, wherein said sensitive catalyst is an organic azo catalyst.

10. The package of claim 9, wherein said catalyst is 2, 2- azo (bis) isobutylnitrile.

11. The package of claim 8, wherein said organic peroxide catalyst is benzoyl peroxide.

12. The package of claim 6, wherein said sensitive catalyst includes benzoyl peroxide and 2,2-azo isobutylnitrile.

13. The package of claim 6, wherein said sensitive catalyst includes 2,2-azo (bis) isobutylnitrile.

14. A package for introducing additives, including a sensitive catalyst suspended in a stabilizing vehicle, two resin formulations containing at least one solvent component, comprising a rigid container having a surface-clinging lining formed on the inside thereof, said lining comprising a removable envelope formed of a film of synthetic organic polymeric material not greater than about 2 mills thick, and soluble in said solvent component, said stabilizing vehicle being mineral oil and said sensitive catalyst being an organic peroxide.

15. A package for introducing additives including at least one sensitive catalyst to resin formulations containing at least one solvent component, comprising a rigid container having a surface-clinging lining formed on the inside thereof, said lining comprising a removable envelope formed of a thin film of synthetic organic polymeric material and soluble in said solvent component, said envelope including a stabilizing vehicle within which said sensitive catalyst is dispersed, said stabilizing vehicle being light mineral oil, white, of a specific gravity at 25°C of between 0.839 and 0.854.

16. The package of claim 15, wherein said catalyst is benzoyl peroxide and said organic polymeric material is polystyrene.

* * * * *

UNITED STATES PATENT OFFICE
CERTIFICATE OF CORRECTION

Patent No. 3,902,596      Dated September 2, 1975

Inventor(s) Malcolm Scott C. McVay

It is certified that error appears in the above-identified patent and that said Letters Patent are hereby corrected as shown below:

The term of this patent subsequent to January 8, 1991, has been disclaimed.

Signed and Sealed this

Twentieth Day of July 1976

[SEAL]

*Attest:*

RUTH C. MASON
*Attesting Officer*

C. MARSHALL DANN
*Commissioner of Patents and Trademarks*